US010742065B1

(12) United States Patent
Rao et al.

(10) Patent No.: US 10,742,065 B1
(45) Date of Patent: Aug. 11, 2020

(54) EMERGENCY LIGHTING SYSTEM AND METHOD FOR PROVIDING EMERGENCY LIGHT

(71) Applicant: Litetronics International, Inc., Bedford Park, IL (US)

(72) Inventors: Raghu Rao, Romeoville, IL (US); Robert Sorensen, Bedford Park, IL (US)

(73) Assignee: Litetronics International, Inc., Bedford Park, IL (US)

( * ) Notice: Subject to any disclaimer, the term of this patent is extended or adjusted under 35 U.S.C. 154(b) by 0 days.

(21) Appl. No.: 16/661,777

(22) Filed: Oct. 23, 2019

(51) Int. Cl.
| H02J 9/02 | (2006.01) |
| F21V 23/00 | (2015.01) |
| H05B 45/50 | (2020.01) |
| F21V 23/02 | (2006.01) |
| H02J 9/06 | (2006.01) |
| H05B 47/19 | (2020.01) |
| H05B 45/20 | (2020.01) |
| H05B 47/29 | (2020.01) |
| F21Y 115/10 | (2016.01) |

(52) U.S. Cl.
CPC ............ *H02J 9/02* (2013.01); *F21V 23/003* (2013.01); *F21V 23/02* (2013.01); *H02J 9/06* (2013.01); *H02J 9/065* (2013.01); *H05B 45/20* (2020.01); *H05B 45/50* (2020.01); *H05B 47/19* (2020.01); *H05B 47/29* (2020.01); *F21Y 2115/10* (2016.08)

(58) Field of Classification Search
CPC .......... H02J 9/02; H02J 9/06; H05B 33/0884; H05B 37/0272; H05B 45/50; H05B 47/19; F21V 23/02; F21V 23/003; F21Y 2115/10
See application file for complete search history.

(56) References Cited

U.S. PATENT DOCUMENTS

| 7,737,640 | B2 * | 6/2010 | Marques | H05B 37/04 315/160 |
| 8,018,161 | B2 * | 9/2011 | Smith, III | H05B 33/0842 315/291 |
| 8,333,481 | B2 * | 12/2012 | Deng | H05B 37/04 315/86 |
| 8,770,771 | B2 * | 7/2014 | Preta | B60Q 1/0023 340/438 |
| 8,823,272 | B2 * | 9/2014 | Trainor | H02J 9/065 315/200 R |
| 9,107,269 | B2 * | 8/2015 | Martin | H05B 33/0884 |
| 9,560,703 | B2 * | 1/2017 | Trainor | H02J 9/065 |
| 9,627,927 | B1 * | 4/2017 | Rao | H01M 10/425 |
| 9,835,691 | B2 * | 12/2017 | Trainor | H02J 9/065 |
| 10,418,847 | B2 * | 9/2019 | Liu | H02J 9/065 |

* cited by examiner

*Primary Examiner* — Vibol Tan
(74) *Attorney, Agent, or Firm* — Steve Witters; Witters & Associates

(57) ABSTRACT

Technologies are described for an emergency lighting system and methods of providing emergency light. The emergency lighting system has a luminaire comprising with least one light source and a wireless communicator module in electrical communication with an uninterrupted power supply. The wireless communicator module is configured to detect a power loss in the uninterrupted power supply and send a wireless signal notification of the power loss. The luminaire is configured to receive the wireless signal notification of the power loss and to supply power to the luminaire with a backup power source.

19 Claims, 4 Drawing Sheets

US 10,742,065 B1

EMERGENCY LIGHTING SYSTEM AND METHOD FOR PROVIDING EMERGENCY LIGHT

FIELD OF THE DISCLOSURE

This invention generally relates to emergency lighting systems and methods for providing emergency light.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Upon an interruption in a power supply or power failure, it is often desired, or even required, to have emergency light. For example, emergency lighting, or "egress lighting", may be needed to provide for automatic illumination in the event of an interruption in the direct or uninterrupted power supply. Emergency lighting may be required under government regulations and may be designed to illuminate and identify hallways, stairwells, and exits to facilitate safe and orderly evacuation from a structure.

Typically, emergency lights or lamps are wired directly to an "uninterrupted power supply" or a dedicated power supply, so that the emergency lamp can sense the power failure and turn on the lamp during an emergency. These emergency lamps are often physically wired from a different line of uninterrupted power than other lamps in the structure or area. This separate wiring of lamps may add labor and material costs.

SUMMARY

In at least one embodiment of the present disclosure, an emergency lighting system is disclosed. The emergency lighting system has a luminaire comprising at least one light source. A wireless communicator module is in electrical communication with an uninterrupted power supply. The wireless communicator module is configured to detect a power loss in the uninterrupted power supply and send a wireless signal notification of the power loss. A controller configured to receive the wireless signal notification of the power loss and to supply power to the luminaire with a backup power source is provided.

In at least one other embodiment of the present disclosure, an emergency lighting system comprising at least two luminaires is provided. A wireless communicator module is in electrical communication with an uninterrupted power supply. The wireless communicator module is configured to detect a power loss in the uninterrupted power supply and send a wireless signal notification of the power loss. Each of the luminaires is configured to receive the wireless signal notification of the power loss and to illuminate with a backup power source.

In at least one further embodiment of the present disclosure, a method of providing emergency lighting in the event of a power failure is provided. The method comprises detecting the power failure with a wireless communicator module in electrical communication with an uninterrupted power supply. Upon detecting the power failure, a wireless signal notification of the power loss is sent with the wireless communicator module. The wireless signal notification of the power loss is received with at least one luminaire. The at least one luminaire is powered with a backup power source, upon the receiving of the wireless signal notification, and provides the emergency lighting.

BRIEF DESCRIPTIONS OF THE DRAWINGS

The foregoing and other features of this disclosure will become more fully apparent from the following description and appended claims, taken in conjunction with the accompanying drawings and examples. Understanding that these drawings depict only several embodiments in accordance with the disclosure and are, therefore, not to be considered limiting of its scope, the disclosure will be described with additional specificity and detail through use of the following figures, which are idealized, are not to scale and are intended to be merely illustrative of aspects of the present disclosure and non-limiting. In the drawings, like elements may be depicted by like reference numerals. The drawings are briefly described as follows:

DETAILED DESCRIPTION

Figure 1:
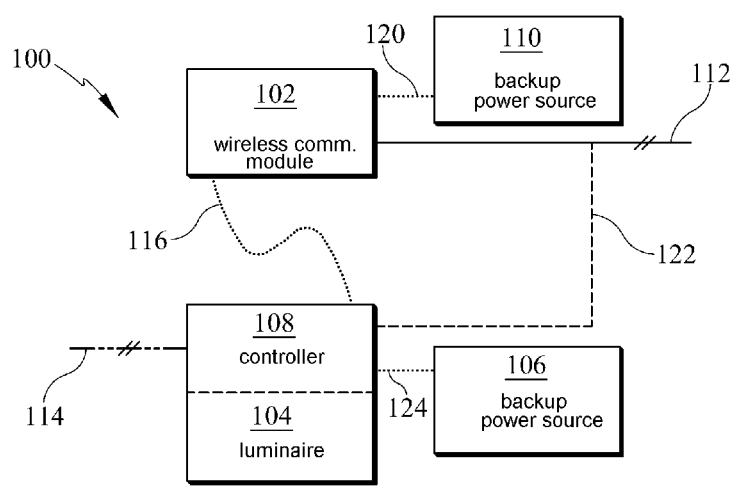
FIG. 1 is an illustrative diagram of an emergency lighting system of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This present disclosure may addresses issues associated with emergency lighting or providing emergency power to lighting devices upon a disruption in a uninterrupted, primary, or external power source or power supply. In at least one embodiment of the present disclosure, an emergency lighting system has a wireless communicator module connected to an uninterrupted power supply. As used herein, an uninterrupted power supply means that the power is being supplied with a dedicated circuit. The dedicated circuit typically has minimal circuit breakers and switches. For example, an uninterrupted power supply may have breakers or switches that are not easily accessible or they may be secured. The wireless communicator module is configured to detect a power loss or failure in the uninterrupted power supply and send a wireless signal notification of the power loss. When the power in the uninterrupted power supply fails, the wireless communicator module communicates with one or more emergency lamp(s) to provide emergency lighting.

At least one luminaire having at least one light source is configured to receive the wireless notification of the power loss sent from the wireless communicator module. The luminaire is configured to power on at least one light source with a backup power source, such as a battery, and provide emergency lighting, upon receipt of the notification of the power loss.

FIG. 1 shows an illustrative diagram of an emergency lighting system 100 of the present disclosure. A wireless communicator module 102 is in electrical communication with an uninterrupted power supply 112. Uninterrupted power supply 112 may be primary, or external, power source or power supply with minimal breakers or switches. For example, uninterrupted power supply 112 may be a dedicated circuit having any breakers, switches, or other means of opening the circuit, secured or installed to prevent opening of the circuit during normal usage of the area or by accident. Emergency lighting system 100 has at least one luminaire 104 with at least one light source.

Wireless communicator module 102 is configured to detect a power loss in uninterrupted power supply 112 and send a wireless signal notification 116 of the power loss. Wireless communicator module 102 may be in electrical communication with a backup power source 110. For example, backup up power source 110 may have a battery and may be in electrical communication with wireless communicator module 102, via electrical communication 120. Backup power source 110 may be configured to power wireless communicator module 102 to send wireless signal notification 116, upon a loss of power from uninterrupted power supply 112.

A controller 108 is configured to receive wireless signal notification 116 of the power loss and to supply power to luminaire 104 with a backup power source 106. For example, backup up power source 106 may have a battery and may be in electrical communication with luminaire 104, or controller 108, via electrical communication 124. Controller 108 may be a part of luminaire 104, or luminaire 104 may be configured to receive wireless signal notification 116 of the power loss and to supply power to luminaire 104 with a backup power source 106

Optionally, luminaire 104, or controller 108, may be in electrical communication with an interrupted power supply 114. Interrupted power supply 114 may have switches or circuit breakers and may supply power to luminaire 104 as desired. For example, interrupted power supply 114 may have switches that are accessible for opening and closing the circuit as desired. Lighting system 100 may be configured to power luminaire 104 as an emergency light and as a typical nonemergency light. In such an embodiment, emergency lighting system 100 may be configured switch luminaire 104 on and off, with switch(es) in interrupted power supply 114, when not operating as an emergency light and, upon receiving wireless signal notification 116, power luminaire 104 with backup power source 106 to provide emergency light. Optionally, luminaire 104, or controller 108, may be in electrical communication with an uninterrupted power supply 112.

In at least one embodiment of the present disclosure, wireless communicator module 102 has an emergency tester configured to remotely or directly test the operation of wireless communicator module 102. For example, wireless communicator module 102 may be configured to test the sending of a wireless signal notification 116 in the event of a power interruption, or power failure, in uninterrupted power supply 112. Wireless communicator module 102 may be configured for direct or remote testing. In at least one embodiment, wireless communicator module 102 may be configured to be operated and/or tested remotely with a portable wireless device such as a smart phone, tablet, or other wireless communications device. The wireless communication device may also be configured to receive wireless signal notification 116 and report the sending of wireless signal notification 116. Alternatively, or additionally, luminaire 104 may serve to report the sending of wireless signal notification 116 by illuminating or providing emergency light. Wireless communicator module 102 may be configured to light an indicator light upon the sending of wireless signal notification 116.

In at least one other embodiment of the present disclosure, luminaire 104, or controller 108, has an emergency tester configured to remotely or directly test the emergency operation of luminaire 104. For example, the emergency lighting provided by luminaire 104 may be configured for direct or remote testing. In at least one embodiment, luminaire 104, or controller 108, may be configured to be operated and/or tested remotely with wireless signal notification 116 sent with wireless communicator module 102 or a portable electronic wireless device such as a smart phone, tablet, or other wireless communications device. For example, a wireless communication device may be configured to send wireless signal notification 116 and test the emergency illumination of luminaire 104.

In at least one embodiment of the present disclosure, lighting system 100 has electrical circuitry in electrical communication with a battery, circuitry and battery schematically shown as 108, and an array of low LEDs in lamp 104, which may be low voltage LEDs. The electrical circuitry may be configured and disposed to switch a power supply to the array of LEDs to supply power with the battery. For example, lighting system 100 may be configured to provide emergency light with backup power upon an interruption or failure of power from an uninterrupted or external power supply.

Lighting system 100 may have an emergency light tester configured to remotely or directly test the operation of the electrical circuitry, the battery, and the light source or array of LEDs.

In at least one embodiment, lighting system 100 has a wireless emergency light tester with wireless communications circuitry configured for the remote testing of the operation of the electrical circuitry, the battery, and the a light source in luminaire 104. For example, lighting system 100 may be configured to be operated and/or tested remotely with a portable wireless device such as a smart phone, tablet, or other wireless communications device.

Figure 2:
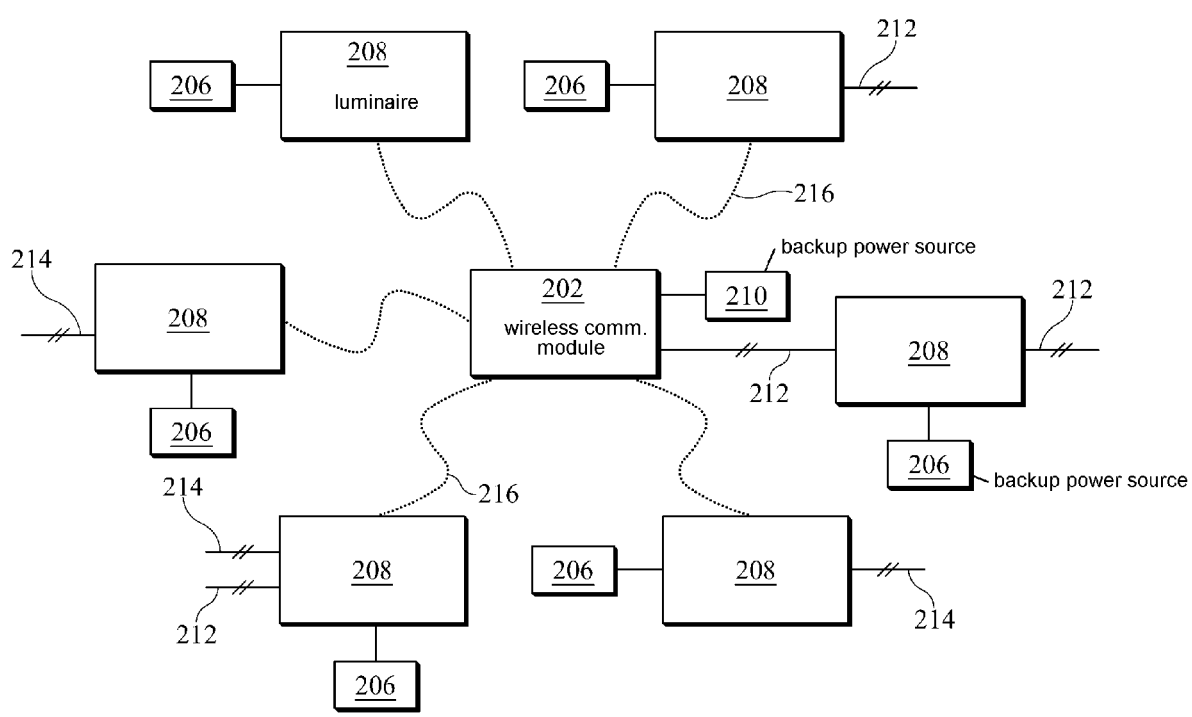
FIG. 2 shows an illustrative diagram of an emergency lighting system of the present disclosure having a plurality of emergency lights.

FIG. 2 shows an illustrative diagram of an emergency lighting system 200 of the present disclosure. A wireless communicator module 202 is in electrical communication with an uninterrupted power supply 212. Uninterrupted power supply 212 may be a primary, or external, power source or power supply. Uninterrupted power supply 212 may have circuit breakers or switches in a dedicated circuit, wherein the circuit breakers or switches are not intended to open the dedicated circuit during normal use of the area. Emergency lighting system 200 has a plurality of luminaires 208, each with at least one light source.

Wireless communicator module 202 is configured to detect a power loss in uninterrupted power supply 212 and send a wireless signal notification 216, indicating the power loss. Wireless communicator module 202 may be in electrical communication with a backup power source 210. For example, backup up power source 210 may have a battery. Backup power source 210 may be configured to power wireless communicator module 202 to send wireless signal notification 216, upon a loss of power from uninterrupted power supply 212.

Each luminaire 208 is configured to receive wireless signal notification 216 of the power loss and to supply power thereto with a backup power source 206. For example, each luminaire 208 may have a controller configured for receiving wireless signal notification 216 and powering the luminaire with a backup power source 206. Each backup power source 206 may have a battery and may be in electrical communication with a luminaire 208. Backup power source 206 may be configured to provide enough power to luminaire 208 for emergency lighting.

In at least one embodiment, wireless communicator module 202 may be housed in a luminaire 208. For example, at least one of a plurality of luminaires 208 be in electrical communication with uninterrupted power supply 212 and may have a wireless communicator module configured to notify the other luminaires 208 of the power outage in uninterrupted power supply 212.

Optionally, one or more luminaires 208 may be in electrical communication with an interrupted power supply 214, an uninterrupted power supply 212, or neither, or both. Interrupted power supply(s) 214 may have accessible switches or circuit breakers and may supply power to luminaire 208 as desired. For example, lighting system 200 may be configured to power one or more luminaires 208 as an emergency light and as a typical nonemergency light. In such an embodiment, emergency lighting system 200 may be configured to switch one or more luminaires 208 on and off as desired, when not operating as an emergency light. Upon an interruption in power supply 214, or power failure, and, upon receiving wireless signal notification 216, power may be provided to luminaires 208 with backup power sources 206 to provide emergency light.

In at least one embodiment, lighting system 200 may be configured to power some luminaires 208 as emergency lights only, as may be configured with no interrupted power supply 214 in communication with the luminaire 208.

In at least one embodiment, backup power supplies 208 and 210 each have a rechargeable battery. Wireless communicator module 202 is configured to sense an interruption of power, or power failure, in uninterrupted power supply 212 and send wireless signal notification 216 with the use of power from backup power source 210. Each luminaire 208 is configured provide emergency lighting upon the interruption of power in uninterrupted power supply 212 with the use of power from backup power source 206.

Each luminaire 208 is configured to sense wireless signal notification 216, upon a power failure in uninterrupted power supply 212, and each luminaire 208 is configured to provide emergency lighting with power from backup power source 206.

Figure 3:
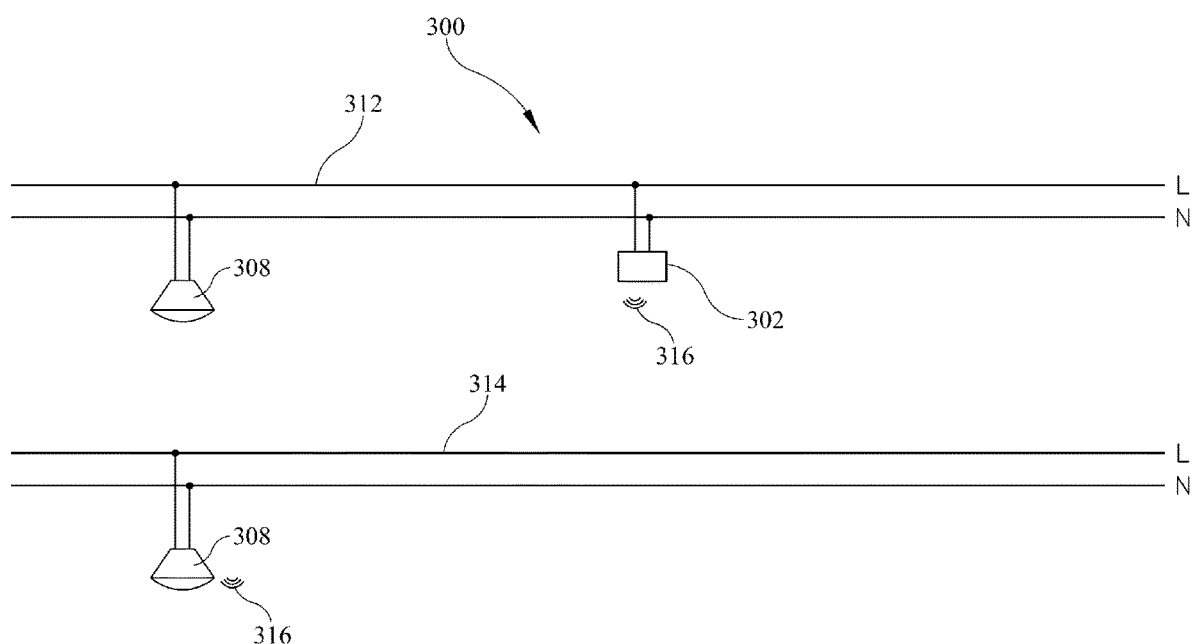
FIG. 3 shows an illustrative diagram of power supplies and electronic communications of the emergency lighting system of the present disclosure.

FIG. 3 shows an illustrative diagram of an emergency lighting system 300 of the present disclosure. A wireless communicator module 302 is in electrical communication with an uninterrupted power supply 312. Uninterrupted power supply 312 may be a primary, or external, power source or power supply or a dedicated circuit having minimal accessible switches and circuits. Emergency lighting system 300 may have a plurality of luminaires 308, each with at least one light source.

Wireless communicator module 302 is configured to detect a power loss in uninterrupted power supply 312 and send a wireless signal notification 316 of the power loss. Wireless communicator module 302 may be in electrical communication with a backup power source for sending wireless signal notification 316, upon a loss of power from uninterrupted power supply 312.

Luminaire(s) 308 is configured to receive wireless signal notification 316 of the power loss in uninterrupted power supply 312 and to supply power to luminaire 308 with a backup power source. For example, luminaire 308 may have a battery and may be configured to provide emergency lighting upon a power outage.

Other and additional luminaires 308 may be in electrical communication with interrupted power supply 314 having a circuit breaker or switch. Luminaires 308 in electrical communication with interrupted power source 314 may be configured to provide emergency lighting upon receipt of wireless signal notification 316. For example, luminaire 308 may have a backup power source and may be configured to provide emergency lighting, upon receipt of wireless signal notification 316, whether in electrical communication with uninterrupted power supply 312, interrupted power supply 314, neither, or both.

Figure 4:
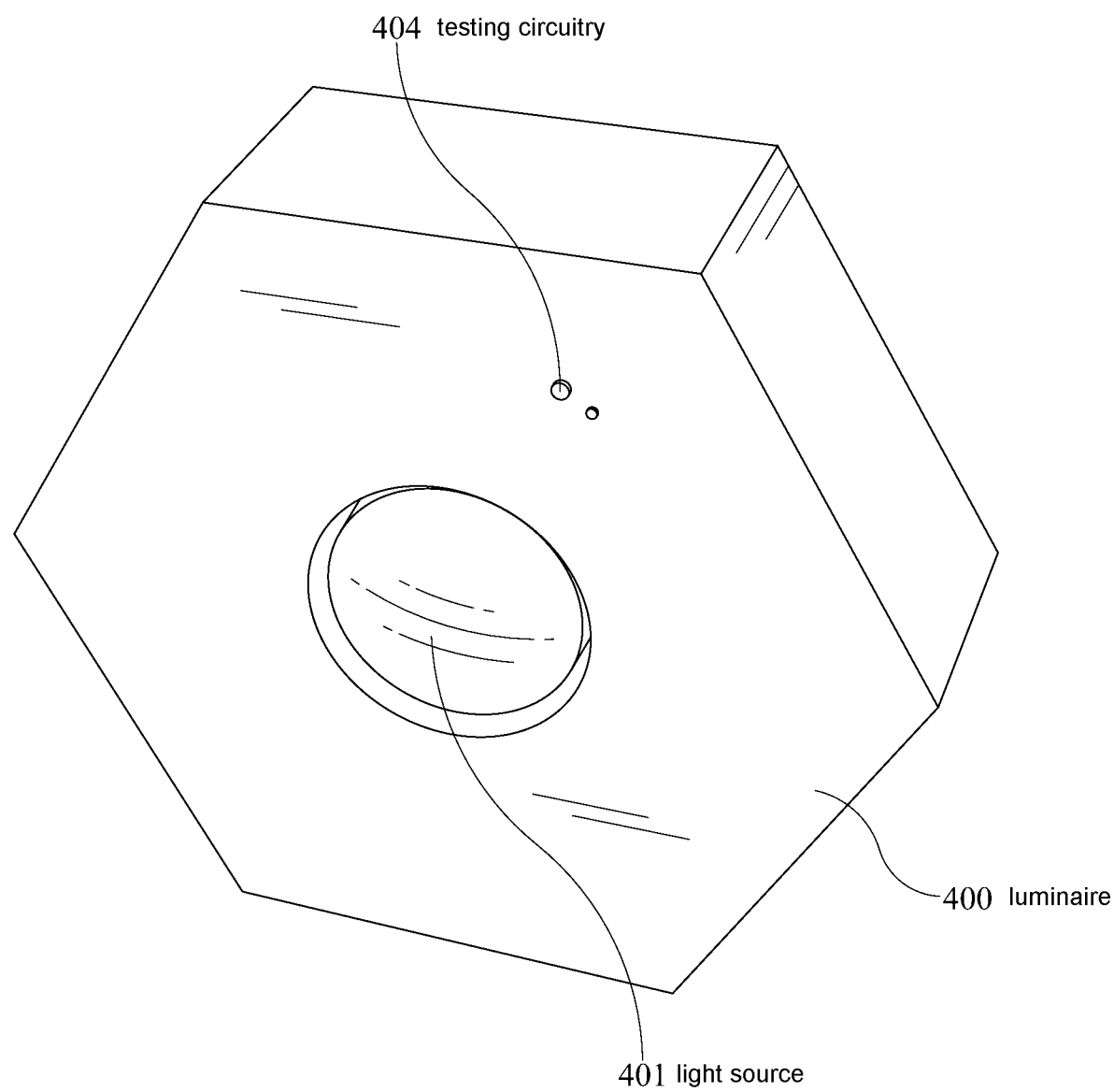
FIG. 4 shows an illustrative example of an emergency luminaire of the present disclosure.

FIG. 4 shows an illustrative example of an emergency luminaire 400. For example, emergency luminaire 400 may be configured to be used as a high-bay light. High-bay lighting is often used for general lighting for industrial buildings. Luminaire 400 has at least one light source 401 and is configured to receive a wireless signal notification in the event of a power outage or loss of power in an uninterrupted power supply to the building. Luminaire 400 is configured to provide emergency lighting upon receipt of the notification of the power loss, with a backup power source. For example, luminaire 400 may have a battery in its housing and may have circuitry for receiving the wireless signal notification and switching power to the at least one light source 401, upon receiving the wireless signal notification.

Luminaire 400 may have testing circuitry which may include testing lights and/or testing controls 404. For example, a wireless communicator module or a portable wireless communication device may be configured to send a notification of a power outage and luminaire 400 may be configured to test the receipt of the wireless signal notification. Alternatively, or additionally, luminaire 400 may be configured to test its backup power source. One or more testing lights or controls 404 may be configured to illuminate or control and provide testing of operational readiness of luminaire 400 in providing emergency lighting, in the event of a power failure to the building in which it is installed.

It is to be understood that the presently disclosed emergency lighting system may comprise a variety of configurations of luminaires. For example, the luminaire(s) may be fixed such as ceiling dome, recessed, cove, troffer, pendant, sconce, track, emergency, exit, high-bay, low-bay, strip, industrial, decorative, flood, longitudinal extending, or have other configurations of luminaires as are known in the art. The light source of the luminaire(s) may be arc, fluorescent, gas-discharge, high-intensity discharge lamp (HID), mercury-vapor lamp, metal-halide, sodium vapor, neon incandescent, halogen, LED, low-voltage LED, quantum dot, or other light source as is known in the art.

In at least one embodiment, the presently disclosed emergency lighting system may be adapted to be installed with existing lighting systems to provide emergency lighting. For example, a wireless communicator module configured to detect a power loss may be placed in electrical communication with an uninterrupted power supply. The wireless communicator module may be configured to detect a power loss in the uninterrupted power supply and to send a wireless signal notification of the power loss. Existing luminaires or light sources may be configured to receive the wireless signal notification of the power loss and provide emergency light. For example, a controller configured to receive the wireless signal notification may be placed in electrical communication an existing luminaire. The controller may be placed in electrical communication with a backup power source for providing emergency lighting.

A method of providing emergency lighting in the event of a power failure is presently disclosed. Emergency lighting may be provided by detecting a power failure with a wireless communicator module in electrical communication with an uninterrupted power supply, wherein the uninterrupted power supply. Upon the detection of the power failure, the wireless communicator module may send a wireless signal notification indicating the power loss. A luminaire, or luminaires, may receive the wireless signal notification of the power loss, sent with the wireless communicator module. Upon receipt of the wireless signal notification, one or more of the luminaires may provide emergency lighting with a backup power source. The wireless communicator module may be powered with a backup power source for sending of the wireless signal notification, upon the detecting of the power failure with the wireless communicator module. The wireless signal notification of the power loss may be received with one or a plurality of the luminaires. One or more of the luminaires may be placed in electrical communication with an interrupted power source, the uninterrupted power source, both, or neither and configured to provide emergency lighting upon receipt of the wireless signal notification.

The wireless communicator module may be tested for the sending of the wireless signal notification upon the detecting of the power failure. For example, a power interruption may be simulated or placed in the uninterrupted power source to which the wireless communicator module is in electrical communication therewith. The testing of the power interruption may be commanded directly, by pushing a button for example, or remotely, with a portable electronic device for example. The wireless communicator module may send the wireless signal notification upon receiving the testing command. The wireless signal notification may be detected a variety of ways such as being detected by the illumination of an emergency luminaire in wireless communication with the wireless communicator module, the illumination of an indicator light on the wirelesses communicator module, or a notification on the portable electronic device.

A backup power source or battery, the powering of the luminaire with the backup power source, and/or the providing of the emergency lighting upon the receiving of the wireless signal notification may be tested. For example, a wireless signal notification may be sent to the luminaire with a portable electronic device or the wireless communication module. In at least one embodiment, the system may be tested by sending a wireless signal to the wireless communicator module with a portable electronic device while the building is surveyed for illumination of the emergency lighting luminaires.

There is thus provided an emergency lighting system and a method for providing emergency lighting. One feature or aspect of an illustrative example is believed at the time of the filing of this patent application to possibly reside broadly in an emergency lighting system comprising: a luminaire comprising at least one light source; a wireless communicator module in electrical communication with an uninterrupted power supply; the wireless communicator module being configured to detect a power loss in the uninterrupted power supply and send a wireless signal notification of the power loss; and a controller configured to receive the wireless signal notification of the power loss and to supply power to the luminaire with a backup power source.

Another feature or aspect of an illustrative example is believed at the time of the filing of this patent application to possibly reside broadly in an emergency lighting system, wherein the luminaire is in electrical communication with an interrupted power supply.

Yet another feature or aspect of an illustrative example is believed at the time of the filing of this patent application to possibly reside broadly in an emergency lighting system, wherein the luminaire is in electrical communication with the uninterrupted power supply.

Still another feature or aspect of an illustrative example is believed at the time of the filing of this patent application to possibly reside broadly in an emergency lighting system, wherein the luminaire is void of an electrical communication with the uninterrupted power supply and void of an electrical communication with an interrupted power supply.

A further feature or aspect of an illustrative example is believed at the time of the filing of this patent application to possibly reside broadly in an emergency lighting system, wherein the backup power source comprises a battery.

Another feature or aspect of an illustrative example is believed at the time of the filing of this patent application to possibly reside broadly in an emergency lighting system comprising at least two of the luminaires.

Yet another feature or aspect of an illustrative example is believed at the time of the filing of this patent application to possibly reside broadly in an emergency lighting system, wherein the wireless communicator module has a backup power source configured for sending the wireless signal notification of the power loss.

Still another feature or aspect of an illustrative example is believed at the time of the filing of this patent application to possibly reside broadly in an emergency lighting system comprising: at least two luminaires, each of the luminaires comprising at least one light source; a wireless communicator module in electrical communication with an uninterrupted power supply; the wireless communicator module being configured to detect a power loss in the uninterrupted power supply and send a wireless signal notification of the power loss; and each of the luminaires being configured to receive the wireless signal notification of the power loss and to illuminate with a backup power source.

A further feature or aspect of an illustrative example is believed at the time of the filing of this patent application to possibly reside broadly in an emergency lighting system, wherein at least one of the luminaires is in electrical communication with an interrupted power supply.

Another feature or aspect of an illustrative example is believed at the time of the filing of this patent application to possibly reside broadly in an emergency lighting system, wherein at least one of the luminaires is in electrical communication with the uninterrupted power supply.

Yet another feature or aspect of an illustrative example is believed at the time of the filing of this patent application to possibly reside broadly in an emergency lighting system, wherein at least one of the luminaires is in electrical communication with the uninterrupted power supply and an interrupted power supply.

One feature or aspect of an illustrative example is believed at the time of the filing of this patent application to possibly reside broadly in an emergency lighting system, wherein the backup power source comprises a rechargeable battery.

Another feature or aspect of an illustrative example is believed at the time of the filing of this patent application to possibly reside broadly in an emergency lighting system, wherein the wireless communicator module has a backup power source configured for sending the wireless signal notification of the power loss.

Yet another feature or aspect of an illustrative example is believed at the time of the filing of this patent application to possibly reside broadly in a method of providing emergency lighting in the event of a power failure comprising the steps of: detecting the power failure with a wireless communicator module in electrical communication with an uninterrupted power supply; sending a wireless signal notification of the power loss, with the wireless communicator module; receiving the wireless signal notification of the power loss, with a luminaire; powering the luminaire with a backup power source, upon the receiving of the wireless signal notification, and providing the emergency lighting.

Still another feature or aspect of an illustrative example is believed at the time of the filing of this patent application to possibly reside broadly in a method of providing emergency lighting in the event of a power failure comprising powering the wireless communicator module with a backup power source, upon the detecting of the power failure with the wireless communicator module.

A further feature or aspect of an illustrative example is believed at the time of the filing of this patent application to possibly reside broadly in a method of providing emergency lighting in the event of a power failure, wherein the step of receiving the wireless signal notification of the power loss comprises receiving the wireless signal notification of the power loss with a plurality of the luminaires.

Another feature or aspect of an illustrative example is believed at the time of the filing of this patent application to possibly reside broadly in a method of providing emergency lighting in the event of a power failure comprising placing the luminaire in electrical communication with an interrupted power source.

Yet another feature or aspect of an illustrative example is believed at the time of the filing of this patent application to possibly reside broadly in a method of providing emergency lighting in the event of a power failure comprising placing the luminaire in electrical communication with the uninterrupted power source.

Still another feature or aspect of an illustrative example is believed at the time of the filing of this patent application to possibly reside broadly in a method of providing emergency lighting in the event of a power failure comprising testing the wireless communicator module for the sending of the wireless signal notification upon the detecting of the power failure.

A further feature or aspect of an illustrative example is believed at the time of the filing of this patent application to possibly reside broadly in a method of providing emergency lighting in the event of a power failure comprising testing the backup power source and the powering of the luminaire with the backup power source, upon the receiving of the wireless signal notification.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An emergency lighting system comprising:
   a luminaire comprising at least one light source;
   a wireless communicator module in electrical communication with an uninterrupted power supply;
   the wireless communicator module being configured to detect a power loss or power failure in the uninterrupted power supply and send a wireless signal notification of the power loss;
   a controller configured to receive the wireless signal notification of the power loss and to supply power to the luminaire with a backup power source; and
   wherein the emergency lighting system comprises electronic circuitry configured for testing the sending of the wireless signal notification upon the detecting of the power loss or power failure.

2. The emergency lighting system of claim 1, wherein the luminaire is in electrical communication with an interrupted power supply.

3. The emergency lighting system of claim 1, wherein the luminaire is in electrical communication with the uninterrupted power supply.

4. The emergency lighting system of claim 1, wherein the luminaire is void of an electrical communication with the uninterrupted power supply and void of an electrical communication with an interrupted power supply.

5. The emergency lighting system of claim 1, wherein the backup power source comprises a battery.

6. The emergency lighting system of claim 1 comprising at least two of the luminaires.

7. The emergency lighting system of claim 1, wherein the wireless communicator module has a backup power source configured for sending the wireless signal notification of the power loss.

8. An emergency lighting system comprising:
   at least one luminaire, each of the at least one luminaire comprising at least one light source;
   a wireless communicator module in electrical communication with an uninterrupted power supply;
   the wireless communicator module being configured to detect a power loss in the uninterrupted power supply and send a wireless signal notification of the power loss;
   each of the at least one luminaires being configured to receive the wireless signal notification of the power loss and to illuminate with a backup power source; and
   wherein the lighting system comprises electronic circuitry configured for testing the sending of the wireless signal notification upon the detecting of the power loss.

9. The emergency lighting system of claim 8, wherein at least one of the luminaires is in electrical communication with an interrupted power supply.

10. The emergency lighting system of claim 8, wherein at least one of the luminaires is in electrical communication with the uninterrupted power supply.

11. The emergency lighting system of claim 8, wherein at least one of the luminaires is in electrical communication with the uninterrupted power supply and an interrupted power supply.

12. The emergency lighting system of claim 8, wherein the backup power source comprises a rechargeable battery.

13. The emergency lighting system of claim 8, wherein the wireless communicator module has a backup power source configured for sending the wireless signal notification of the power loss.

14. A method of providing emergency lighting in the event of a power failure comprising the steps of:
   detecting the power failure with a wireless communicator module in electrical communication with an uninterrupted power supply;
   sending a wireless signal notification of the power loss, with the wireless communicator module;
   receiving the wireless signal notification of the power loss, with a luminaire;
   powering the luminaire with a backup power source, upon the receiving of the wireless signal notification, and providing the emergency lighting; and
   testing the wireless communicator module for the sending of the wireless signal notification upon the detecting of the power failure.

15. The method of providing emergency lighting in the event of a power failure of claim 14 further comprising powering the wireless communicator module with a backup power source, upon the detecting of the power failure with the wireless communicator module.

16. The method of providing emergency lighting in the event of a power failure of claim 14, wherein the step of receiving the wireless signal notification of the power loss comprises receiving the wireless signal notification of the power loss with a plurality of the luminaires.

17. The method of providing emergency lighting in the event of a power failure of claim 14 further comprising placing the luminaire in electrical communication with an interrupted power source.

18. The method of providing emergency lighting in the event of a power failure of claim 14 further comprising placing the luminaire in electrical communication with the uninterrupted power source.

19. The method of providing emergency lighting in the event of a power failure of claim 14 further comprising testing the backup power source and the powering of the luminaire with the backup power source, upon the receiving of the wireless signal notification.

* * * * *